Nov. 14, 1950    T. H. KRUEGER ET AL    2,530,335
ADHESIVE TAPE DISPENSER
Filed Jan. 28, 1946    3 Sheets-Sheet 1
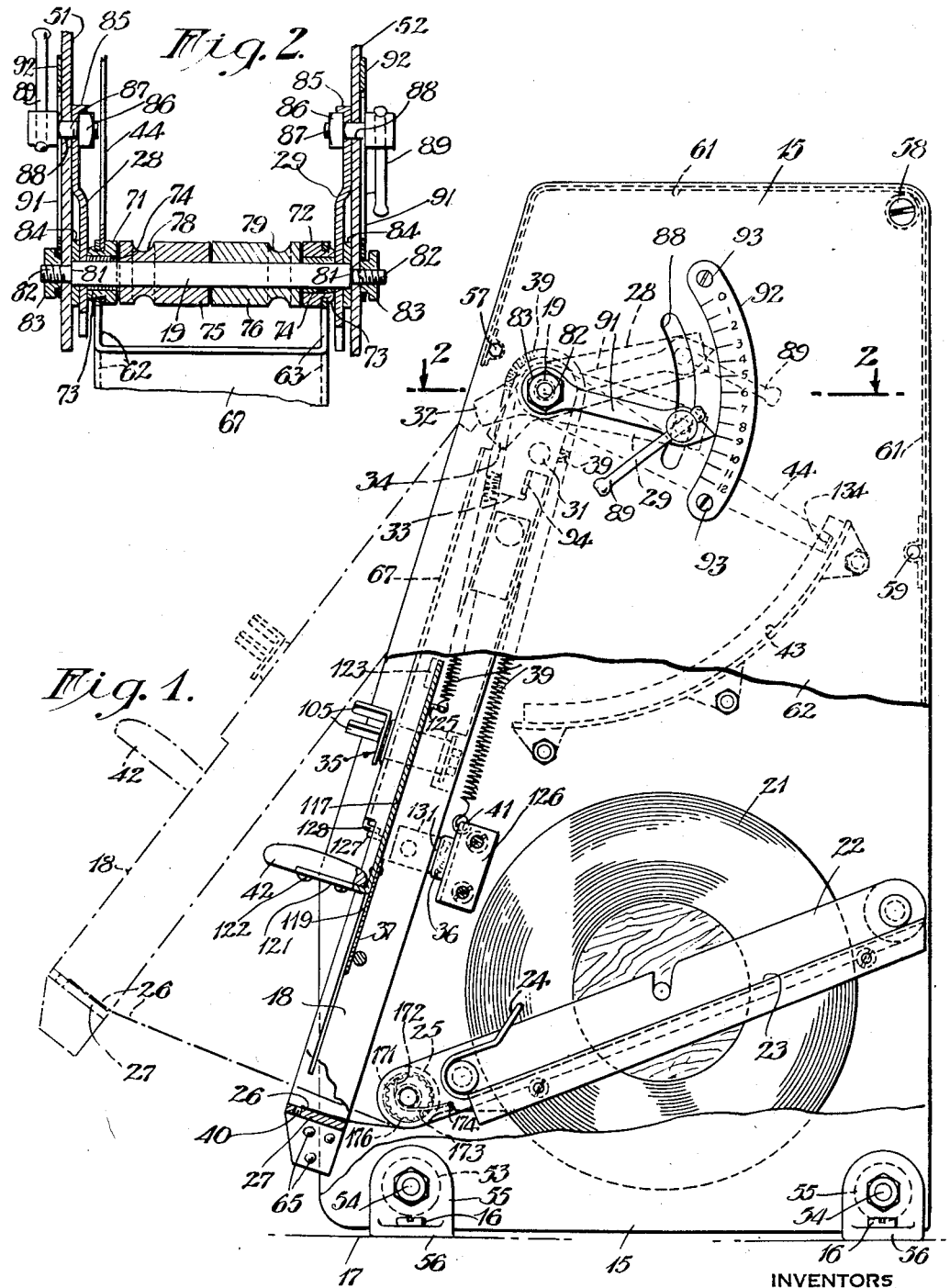
INVENTORS
THEODORE H. KRUEGER
EVERETT E. SHARPE
BY
Moses, Nolte, Crews & Bury
ATTORNEYS Nov. 14, 1950  T. H. KRUEGER ET AL  2,530,335
ADHESIVE TAPE DISPENSER
Filed Jan. 28, 1946  3 Sheets-Sheet 2
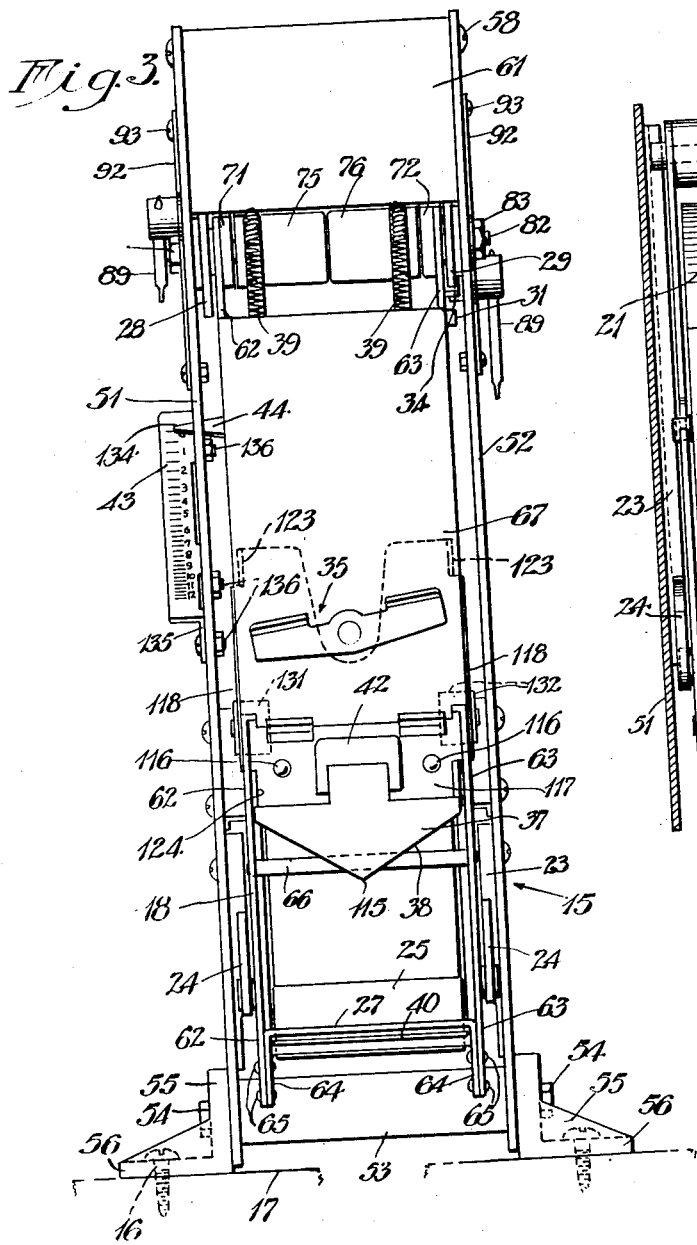
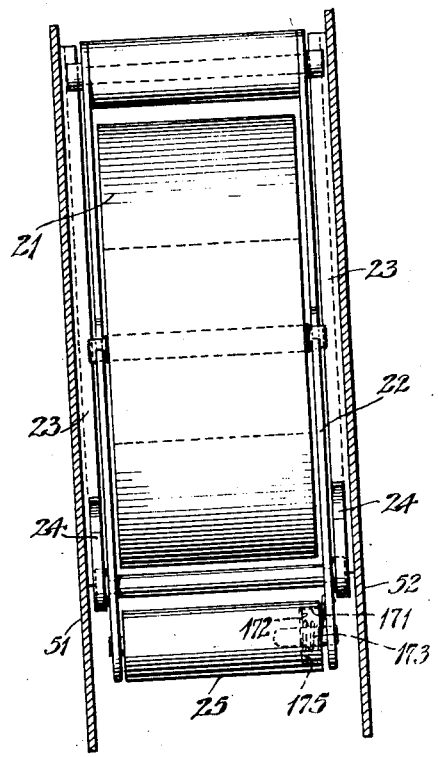
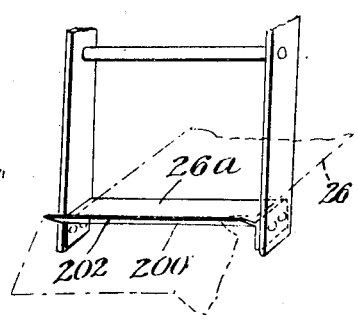
INVENTORS
THEODORE H. KRUEGER
EVERETT E. SHARPE
BY
Moses, Nolte, Crews & Berry
ATTORNEYS

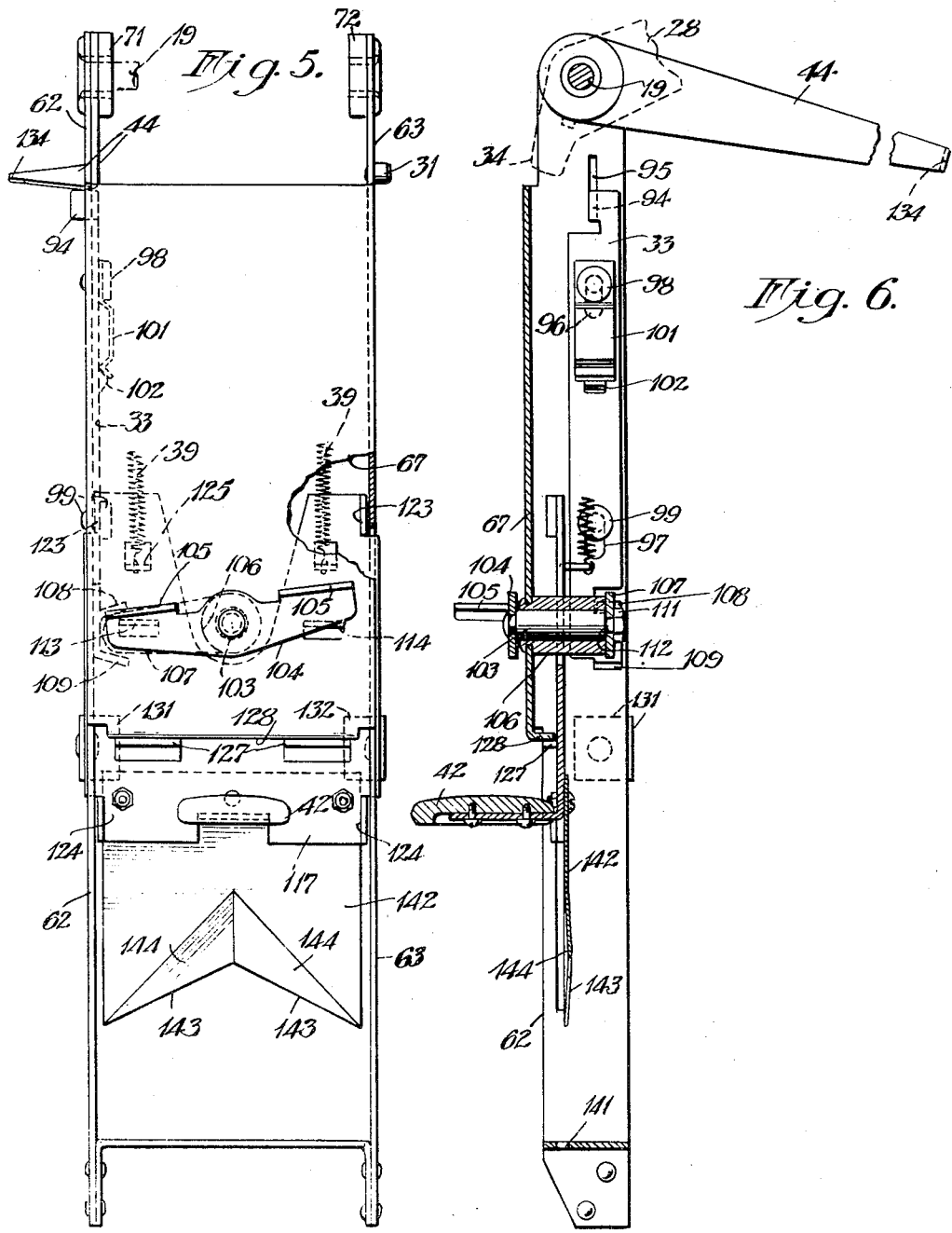

Patented Nov. 14, 1950

2,530,335

UNITED STATES PATENT OFFICE 2,530,335

ADHESIVE TAPE DISPENSER

Theodore H. Krueger, Stratford, and Everett E. Sharpe, Shelton, Conn., assignors to Better Packages Incorporated, a corporation of New York Application January 28, 1946, Serial No. 643,934

14 Claims. (Cl. 164—48)

This invention relates to apparatus for serving measured lengths of tape which is covered or impregnated on one side with a pressure-sensitive, tacky or non-drying adhesive.

This apparatus is especially adapted for handling wide and heavy tacky tape, (one and one-half to three inch widths for example) such as is used for sealing large packages and boxes and with which considerable pull is required to withdraw the tape from the roll. Generally, the apparatus is provided with a substantial frame or casing which has some height (for example one to two feet). At the top of such frame there is pivotally supported on a horizontal axis a swinging yoke or pendulum with a grasping table at its lower end. This grasping table is of sufficient size to receive the end of the tape from a roll which is housed within the frame. By an outward pull of the pendulum with the end of the tape held on the grasping table, the tape is evenly drawn from the roll and without unnecessary effort. By limiting the movements of the pendulum to measured distances, measured lengths of tape may be served. Means are provided for severing the withdrawn lengths of tape after the return of the yoke or pendulum to initial position, such means preferably being carried by the pendulum. While the apparatus of this invention finds particular utility in the handling of relatively wide tapes, as pointed out above, it can also be used for light weight and narrow tapes, if desired. The dimensions of the apparatus would naturally be chosen to suit the type of tape to be handled. In particular, the length of the pendulum arm may be varied depending upon the range of tape lengths which it is desired to dispense.

The primary object of this invention is to provide a dispenser for tacky tape which may be used to dispense such tape, measured either by visual observation or by use of pre-settable stops, which is effective and simple to use and which will dispense the measured lengths of tape in the most accessible manner and without danger of the tape becoming wrinkled or twisted or adhered to any part of the apparatus while being dispensed.

Another object of the present invention is to provide a sticky tape serving apparatus wherein the means for setting the apparatus to dispense different lengths of strip is readily accessible to the operator and is of such design that a change-over from one length to another can be effected instantly and by a single stroke of the operator's hand in one direction.

It is another object of the invention to provide a strip-serving apparatus in which the operating handle for the means for selecting the different lengths of strip is at the front of the apparatus and on the pivoted measuring member.

It is still another object of the invention to provide a strip-serving apparatus in which the shearing device for severing the tape is on the movable measuring member.

For other objects and a better understanding of the invention, reference may be had to the following detailed description taken in connection with the accompanying drawings, showing certain illustrative embodiments of the invention in which Figure 1 is a side elevation of one form of strip serving apparatus made in accordance with the invention, Figure 2 is a fragmentary view, in section on line 2—2 of Fig. 1, showing the pivot connection of the measuring member with the stationary support, Figure 3 is a front elevation of the apparatus and showing one form of a tape cut-off shear;

Figure 4 is a horizontal sectional view taken through the apparatus and looking in plan upon the tape reel and removable tape cradle;

Figure 5 is a detailed front elevation of the swinging measuring member or pendulum detached from its stationary support and showing a modified form of cutter blade;

Figure 6 is a vertical central cross-section view of the measuring member;

Figure 7 is a bottom edge view of the cutter blade shown in Figs. 5 and 6; and

Figure 8 is a detailed perspective view of a modified form of cut-off shear.

Referring now particularly to Figs. 1 to 6, the tape serving apparatus shown comprises a stationary supporting frame or casing 15 adapted to be secured as by screws 16 to a table top 17, and a tape measuring member or pendulum 18 pivoted to the stationary frame through a pivot support 19. The tape roll 21 is supported in a tape roll cradle 22, which in the preferred form of the invention shown is removably supported in cradle mounting slides 23 in the stationary frame 15. The mounting strips 23 have hook formations 24 thereon which receive and retain the forward end of the tape cradle. The tape cradle carries an adhesion and guide roller 25. When it is desired to load a new roll of tape in the strip-serving apparatus the cradle and the empty tape roll are slid upwardly and out of the tape cradle mounting slides. The removable tape cradle construction shown is not claimed herein as it forms the subject matter of an application for patent filed by Theodore H. Krueger, Serial No. 624,012, filed October 23, 1945.

The tape end 26 with its tacky side up is held on a grasping table 27 at the lower end of the measuring member 18 and is pulled forwardly therewith as the pendulum is swung outwardly and about the pivot support 19. In order to enable the delivery of pre-determined lengths of tape, adjustable stop means are provided for limiting the forward swinging movement of the pendulum measuring member 18. In case it is desired to deliver only one pre-determined length of tape for one setting of the machine a single adjustable stop device may be provided for stopping the movement of the pendulum. In the preferred form of the invention illustrated, however, a pair of adjustable stops are provided which may be set for the delivery of two alternative lengths of tape and a selective mechanism is provided which may be actuated by the operator so as to deliver whichever length he may at the time select. This mechanism is as follows:

Pivoted on the pivot support 19 at opposite sides of the main supporting frame 15 are adjustable stops 28 and 29. The stop 29 is operable to measure off the longer of two strips for which the apparatus is adapted to dispense and will cause the pendulum to stop as a fixed abutment 31 on the pendulum engages arm 32 thereof. A second abutment 33 on the pendulum is provided, which is adjustable into and out of a position so that it can engage an arm 34 of the adjustable stop 28 to measure off a short strip, or be left in its retracted position so that it will not engage the arm 34, thereby to permit the pendulum to swing by so that the fixed abutment 31 engages the arm 32 to measure off the long length strip.

The abutment 33 is adjusted between its up and down positions by a selector mechanism 35 on the front of the measuring member and readily accessible to the operator.

After the measuring member has been drawn outwardly against either one of the stops 28 or 29, the end of the tacky strip is lifted from the grasping table 27 and held upwardly while the pendulum 18 is returned by gravity to its at rest position against a stop cushion 36, Fig. 1. When in this position means are provided for severing the strip which extends outwardly of the machine beyond the now returned pendulum and grasping table. As this length of strip was measured by reason of the limitation in the movement of the pendulum, a strip of measured length will be dispensed. The means for severing tape conveniently may be carried by the pendulum itself. In the form of invention shown in Figs. 1 to 6 a knife blade 37 having a shear edge 38 is brought downwardly through a cooperating slot in the grasping table 27 to cut off the measured tape strip. The knife 37 is returned automatically to its raised position by tension springs 39 extending upwardly over the pivot support 19 and anchored at 41 to the bracket carrying the cushion 36 in rear of the measuring member. A thumb pad 42 is depressed to operate the knife 37.

In order to measure the tape visually a scale 43 is mounted on the left side of the apparatus and a pointer 44 on the pendulum will show how much tape has ben withdrawn from the roll at any moment during the withdrawal of the tape so that the operator can stop at any length from zero to twelve inches, assuming the adjustable stops 28 and 29 are set out of the way so as not to interfere with the outwardly swinging movement of the pendulum 18.

The main supporting frame 15 comprises two side plates 51 and 52 held in transversely spaced relationship at the bottom by large diameter sleeves 53 carried by bolts 54. The same bolts 54 serve to fasten supporting feet 55 to opposite sides of the vertically-extending side plates 51, 52. The supporting feet 55 have laterally-extending portions 56 through which extend the attaching screws 16 to connect the apparatus to the table support 17. There are two pairs of these supporting feet 55 at the bottom of the frame, one pair located near the front face thereof and the other pair at the rear. Near the top of the frame 15, the side plates 51 and 52 are transversely spaced by three spacing members 57, 58 and 59. These spacing members carry a cover plate 61 extending from a point near the transverse member 57 at the front of the frame upwardly and over the spacing member 58 at the rear top corner of the frame and down the back of the supporting frame to a point adjacent the spacing member 59. Other spacing members may be used if located strategically so as not to interfere with the working parts within the frame.

The front of the supporting frame 15 is open from the bottom upwardly to the pivot support 19 so as to permit the tape measuring member or pendulum 18 to swing freely outwardly and on its return movement to swing into the frame. The measuring member 18, as seen more clearly in Figs. 5 and 6 includes two side pieces 62 and 63 held in transversely spaced relation at the bottom by means of the grasping table 27 which has down turned ends 64 fastened respectively by means of rivets 65 to the measuring member side pieces 62 and 63. Upwardly of the grasping table 27 the side pieces are further held in transversely spaced relation by a cross rod 66. Upwardly of the cross rod 66 is a sheet metal portion or web 67 extending for a substantial distance throughout the upper part of the measuring member and integrally connected with the upper edges of the side pieces 62, 63. The measuring member may be said to have the form of a channel with the sheet metal portion or web 67 serving as a closure for the front part of the main frame when the measuring member is in the down position.

On the upper ends of the side pieces 63 are thickening rings or hubs 71 and 72 secured thereto by means of flanges 73. The ring 71 is not as thick as the ring 72 since between it and the inner face of the side piece 62, is disposed one end of the pointer arm 44. The arm 44 is clamped to and made rigid with the side piece 62 so as to always maintain its angular relationship with respect thereto and to swing with the measuring member. By virtue of these rings or hubs 71, 72 and the inner end of the arm 44 there is provided a support for the bearing bushing 74, Fig. 2. The pivot shaft 19 extends between and through these bearing bushings and carries a pair of spools 75 and 76 respectively having grooves 78 and 79 on their ends adjacent to these hubs. Each end of the shaft 19 extends outwardly beyond the side pieces 62 and 63 of the measuring member for rigid connection with the side plates 51 and 52 on the main supporting frame 15. In order to make this connection the ends of the shaft are shouldered at 81 so as to bear against the inner faces of the side plates of the main frame and have reduced diameter portions 82 which are threaded to receive clamping nuts 83 on the outside of the main frame. Just inside of the side plates and flush with their inner faces are spacing washers 84 and just inside of the spacing washers the adjustable stop arms 28 and 29 are pivotally mounted on the shaft 19.

The outer ends of the arms 28 and 29 have inwardly turned flanges 85 adapted to retain clamping nuts 86 against turning movement. Clamping screws 87 having heads located externally on the side plates extend through arcuate shape slots 88 in such plates and screw into the nuts 86 and may be tightened by turning clamping bars 89. Pivoted on the pivot shaft locking nuts 83 and adapted to be carried by the clamping screws 87 as they are moved through the openings 88 are pointer arms 91 adapted to register with scales 92 secured to the outer faces of the side plates by screws 93. These scales 92 are marked off from zero to twelve, corresponding to inches of the tape to be dispensed. Obviously any other suitable scale of divisions may be utilized. One of the stop arms is adjusted so as to measure one length of tape and the other stop arm is adjusted to measure a different length of tape. For example, as shown in Fig. 1 the arm 28 which serves to set the apparatus to dispense the short strip may have its pointer register with the number 3 on the scale at the one side of the apparatus while arm 29 may have its pointer register with the number 9 for a 9-inch length with the scale at the opposite side of the apparatus. As above described, the abutment 31 on the measuring member side piece 63 will engage the extension 32 of the arm 29 when a strip of tape 9-inches in length has been drawn from the tape roll 21 by the measuring member 18. When the adjustable abutment 33 on the measuring member is in its raised position so as to engage the stop portion 34 of the arm 28, a three-inch length of tape will be drawn from the tape roll 21. Three-inch length strips will be continuously served until such a time as the adjustable abutment 33 on the measuring member 18 is retracted to its lowered position and out of registration with the stop portion 34. Thereafter, 9-inch strips will continue to be served by the measuring member 18 until such time as the adjustable abutment 33 is again raised to its operative position.

The mechanism for operating the adjustable abutment 33 will now be described. Still referring particularly to Figs. 5 and 6 it will be seen that the adjustable abutment 33 takes the form of a flat strip adapted to lie flatwise against the inner face of the side piece 62 of the measuring member 18. Its upper end has an outwardly turned engaging portion 94 extending through an elongated slot 95 in the side piece 62. It is this engaging portion 94 that engages the stop portion 34 of the stop 28. The abutment 33 has slots 96 and 97 through which extend fastening rivets 98 and 99. These rivets, however, do not limit the vertical sliding movement of abutment 33. The upper rivet 98 carries a retaining spring finger 101 adapted to ride over a shoulder 102 and retain the adjustable abutment 33 in its raised position.

The operating mechanism for the adjustable abutment 33 comprises a pivot shaft 103 rotated by a cross arm handle 104 with forwardly extending handle portions 105 easily accessible to the operator at the front of the apparatus. The pivot shaft 103 is journalled in a bearing sleeve 106 secured by its outer end to the integral sheet or web 67 of the measuring member 18. On the inner end of the shaft 103 and extending to the left as viewed in Fig. 5 is an arm 107 adapted to extend into a space between inwardly depressed portions or lugs 108 and 109 on the lower end of the adjustable abutment strip 33. This arm 107 is made rigid with the shaft 103 by means of a locking nut 111 adapted to force the arm 107 into rigid engagement with a shoulder 112 of the shaft 103.

As the selector arm 104 is rotated in a clockwise direction, the arm 107 engages the upper lug 108 of the adjustable abutment 33 and continued movement causes the adjustable abutment 33 to be moved upwardly to assume its raised or operative position. Counter-clockwise rotation of the selector arm 104 causes the arm 107 to engage the lower lug 109 of the adjustable abutment 33 so as to withdraw it from its raised position to a lowered or retracted position where it will not be in registration with the stop portion 34 of the stop arm 28.

It will now be apparent that the operator can measure off at will by merely turning selector arm 104 in one direction or the other either 3-inch or 9-inch lengths of the tape as he so desires, assuming the stops 28 and 29 are set as shown in Fig. 1.

Projecting outwardly from the spacing sheet part or web 67 are lug portions 113 and 114 adapted to be respectively engaged by inward extensions of handles 105 on the arm 104. The lug 113 limits the downward movement of the arm 107 while the lug 114 limits the upward movement of the arm 107.

One form of severing mechanism will now be described. The knife blade 37 is of stabber shape with a point 115 in the middle of the blade. It is secured by rivets 116 to a blade carrying part 117 having outside projections 118, (Fig. 3) extending into elongated slots 119 (Fig. 1) in the side pieces 62 and 63. The operating pad 42 for depressing the knife is fixed to an outwardly-extending projection 121 of part 117 by screws 122. The upper end of the carrying part 117 has outwardly-turned projections 123 adapted to slide along the inner faces of the side pieces 62 and 63 to prevent edgewise sliding movement of the carrier member 117 through the slots 119. Similar outwardly-turned projections 124 are provided at the lower end of the carrier plate 117.

As the blade is brought downwardly it registers with the slot 40 of the grasping table 27. The portion of the strip 26 located in the path of the blade 37 is severed by the blade 37 passing through the opening 40. Upon releasing the blade the same is returned automatically to its normally raised position by the springs 39 connected to inwardly-extending lugs 125 on the back of the blade carrier 117 and extending upwardly over grooves 78, 79 of spools 75 and 76 rotatable on pivot shaft 19 and thence downwardly for connection 41 with the cushion-supporting bracket 126. Its upward return movement is limited by stop projections 127 punched outwardly from the blade carrier 117 for engagement with an inwardly-turned flange 128 on the lower end of the spacing sheet or web 67.

To limit the return movement of the swinging measuring member 18 and to retain it in its rest position there are provided on the side pieces 62 and 63 of the member 18, inwardly-turned brackets 131 and 132 adapted to engage with cushioning pads 36 secured to the brackets 126 on the side plates 51, 52 of the supporting frame 15.

In order that the operator may have a visual indication of the tape length to enable him to dispense measured lengths shorter than those for which the stops are set, the arm 44 has an outwardly-turned pointer 134 adapted to register with the scale 43. This scale 43 is likewise numbered from zero to 12 to give an indication of the number of inches of tape that has been withdrawn. The scale 43 has downwardly turned lug portions 135 adapted to be respectively fastened to the outer face of the side plate 51 by means of fastening screws 136.

The form of cutting mechanism shown in the Figs. 1 and 3 is used for cutting cellophane and paper tapes, but when cloth tape is to be dispensed, a mechanism having a shear action is used (Figs. 5 and 6) having one shear cutting edge on the grasping table as indicated at 141 and a movable blade 143 mounted on the blade carrier 117 and having a shear edge or edges 143 adapted to cooperate with the edge 142 to cut the strip with a true shearing action. In the form of cutter illustrated, the blade 142 is provided with two inclined edges 143 sloping from the side edges of the blade towards the center. The blade immediately above the edges is formed with two inclined portions 144 which are bent from the plane of the blade in the direction from which the tape is fed. This formation of the blade causes the edges 143 to be inclined upwardly and inwardly so that as the blade is forced through the slot in the grasping table, each edge 143 will slide in contact with the edge 141 progressively touching such edge at one point only at any one moment, so as to produce a true shearing or scissors action. The blade is of sufficiently flexible material to permit it to be deflected as this shearing action takes place.

The guide or adhesion roller 25 is preferably provided with ratchet teeth 171 cooperating with a pawl member 172 carried by the cradle 22. The pawl member preferably comprises the end of a spring 173 coiled around the shaft of the adhesion roller and anchored at its free end to the side piece of the cradle as indicated at 174. The teeth 171 are formed on the inner wall of a recess 175 in the end of the roller. If the roller is made of plastic or wood, the teeth 171 may conveniently be formed in a ring 176 fitted in the recess.

The guide or adhesion roller 25 is preferably provided with ratchet teeth 171 cooperating with a pawl member 172 on the side piece of cradle 22. This ratchet dog is urged into locking engagement with the ratchet wheel 171 by a spring 173. The tape as it is drawn over the roller 25 tightly adheres to the same and is peeled off from this roller as the pendulum is swung outwardly with tape end. By provision of a ratchet no slack is allowed in the tape between the adhesion roller 25 and the tape roll 21 and the projecting end of the strip resting on the grasping table cannot be pushed or drawn back into the machine.

Figure 8 shows an alternative construction of cutting means for the tape. In this construction the grasping table 26a has no knife slot therein, and no movable cutter or knife is provided on the pendulum member. For cutting the tape the grasping table is provided with a tear-off blade 200 which is preferably mounted at an angle to the table. The tear-off blade is preferably provided with a serrated edge 202.

While we have illustrated and described in detail certain preferred forms of our invention, it is to be understood that changes may be made therein and the invention embodied in other structures. We do not, therefore, desire to limit ourselves to the specific constructions illustrated, but intend to cover our invention broadly in whatever form its principle may be embodied.

What is claimed is:

1. In apparatus for serving pressure sensitive tape, a main supporting frame, a plurality of adjustable stops on the main supporting frame, a measuring member movably connected to the supporting frame by means permitting back and forth movement to and from a position of rest, said measuring member including a support movable with the leading end of the tape during movement of the measuring member away from its position of rest, a selector mechanism cooperating with the stops to effect the engagement of the measuring member with either one or another of the adjustable stops so as to limit its range of movement whereby to dispense a tape strip of one length when engaging one of the stops and a tape strip of another length when engaging another of said stops.

2. In a two-length tape strip serving apparatus, a main supporting frame having two spaced plates, a measuring member pivoted between the spaced plates of the supporting frame, said measuring member including a support for the leading end of the tape, a pair of adjustable stops adapted to be fixed relative to the supporting frame, a pair of abutments carried on the measuring member and adapted to cooperate with the stops, one of said abutments being adjustable to and from an operative position, said abutment when in the operative position being adapted to engage one of its stops but when retracted from its operative position permitting the other abutment to engage its stop, and selector mechanism on the measuring member for adjusting the adjustable abutment.

3. In a strip serving apparatus, a supporting frame including a pair of upright spaced plates, a pivot shaft extending between said spaced plates near the top thereof, adjustable stops carried by said supporting frame, a measuring member pivoted on said pivot shaft and adapted to swing forwardly with a strip of tape, a selector mechanism on the measuring member including abutment means located near the pivot shaft and adapted to effect the abutment of the measuring member with one or the other of the adjustable stops, a tape roll mechanism located near the bottom of the supporting frame, and dispensing to the lower end of the measuring member a continuous strip of tape, and stop means on the supporting frame against which the measuring member may rest when it is returned to allow another strip of tape to be picked up.

4. In a strip serving apparatus, a supporting frame having spaced plates, a measuring member pivotally connected between the spaced plates and adapted to be swung outwardly in front of the supporting frame, a tape support on the measuring member, means for mounting a tape roll in the supporting frame with the leading end of the tape supported on the tape support on the measuring member so that as the measuring member is pulled outwardly with the end of the tape a portion of tape is taken from the tape roll, a measuring scale connected to the supporting frame, and an indicator movable with the measuring member and cooperating with the measuring scale so that the amount of tape which has been pulled out with the measuring member may be visually determined.

5. In a strip serving apparatus, a supporting frame having spaced plates, a measuring member pivotally connected at its upper end to the spaced plates, means for supporting a tape roll in the supporting frame with its leading tape end engaging the measuring member so that as the measuring member is pulled outwardly a strip of tape is taken with it, an arcuate slot in one of the frame side plates, a laterally-extending arcuate shape index scale connected to the frame plate adjacent to the arcuate slot, a pointer arm fixed to the measuring member at its point of connection with the main frame and extending downwardly and laterally through the arcuate slot for cooperation with the index scale, whereby the operator can determine at any time the length of the strip which has been withdrawn from the tape roll.

6. In a strip serving apparatus, a main supporting frame, a measuring member comprising a swinging arm pivotally connected to the supporting frame and having a grasping table thereon near the end thereof remote from the pivotal point, means for supporting a tape roll in the supporting frame with its leading end engaging the grasping table so that as the measuring member and grasping table is moved a portion of the tape will be taken with it, and a severing knife blade slidably mounted on the measuring member, said grasping table having an edge adapted to cooperate with the knife blade to sever the measured strip of tape.

7. In a strip serving apparatus, a main supporting frame, a measuring member pivotally connected to the main supporting frame, and adjustable stop means carried on the main supporting frame and including a pair of stops, selector mechanism on the measuring member adapted to effect the use of one or the other of said stops whereby the measuring member may be pulled outwardly to one position or another depending upon the setting of the selector mechanism to dispense tape strip of one length or another, means for supporting a tape roll carried in the supporting frame with its leading end engaging the measuring member to be pulled outwardly therewith and means on the measuring member for severing the tape when the measuring member has pulled out a length of tape and been returned to a rest position.

8. In a strip serving apparatus, a main supporting frame having side plates, a pivot shaft extending between the side plates near the top of the frame, a measuring member journalled on the pivot shaft and adapted to be pulled outwardly with a length of tape, means on the supporting frame for supporting the measuring member in a position of rest, means for supporting a tape roll in the supporting frame with its leading end engaging with the measuring member and adapted to be pulled out when the measuring member is swung forwardly, movable knife means on the measuring member for severing a strip of tape when the measuring member has been returned to its rest position, and a tension spring extending from the knife means upwardly and over the pivot shaft and downwardly to an anchor point on the main supporting frame, and spool means carried on the pivot shaft for supporting the tension spring and permitting its movement thereover when the knife means is operated.

9. In a tape dispensing apparatus, a main supporting frame having a base adapted to rest upon a table support, means for mounting a tape roll in the main supporting frame, a pendulum pivoted at the top of the main supporting frame to swing on a horizontal axis cooperating scale and indicator means, one member of which is mounted on the supporting frame and the other member of which is operatively connected to the pendulum to move therewith so as to indicate the extent of movement of the pendulum, and a grasping table on the lower end of the pendulum adapted to receive tape from the tape roll.

10. In apparatus for serving pressure sensitive tape, a supporting frame, means for mounting a roll of tape in the frame with its axis horizontal, a horizontal pivot support in the frame above the support for the roll of tape, a swinging dispensing member mounted on said pivot support and movable outwardly of the frame away from the tape roll mounting means, a grasping table on the lower part of said swinging dispensing member, means for guiding the leading end of the tape from the roll of tape over said grasping table, and tape severing means associated with the swinging dispensing member, said tape severing means comprising a reciprocating cutter for cutting the tape while supported on the grasping table.

11. In a strip serving apparatus, a frame, means in the frame for supporting a roll of tape, a pivot support in the frame, a swinging dispensing member pivotally mounted on said pivot support and extending downwardly across the front of the frame, a plurality of adjustable stops for limiting the outward swinging movement of the swinging dispensing member, and selector mechanism for rendering said stops selectively operative, said selector mechanism including an operating member having finger engaging means at the front of said swinging dispensing member.

12. In a strip serving apparatus, a frame, means in the frame for supporting a roll of tape, a pivot support in the frame, a swinging dispensing member pivotally mounted on said pivot support and extending downwardly across the front of the frame, a plurality of adjustable stops for limiting the outward swinging movement of the swinging dispensing member, and selector mechanism for rendering the stops selectively operative, said selector mechanism including a cross arm pivotally mounted at a point intermediate its length on the swinging dispensing member and having finger pieces at opposite ends thereof for tilting said cross arm in one direction or the other to actuate the selector mechanism.

13. In a strip serving apparatus, a strip cutting means comprising a relatively stationary shear blade having a shearing edge, a movable shear blade cooperating therewith, said movable shear blade comprising a plate of yielding resilient material having a pair of oppositely-inclined shear edges formed thereon arranged to form an apex intermediate the side edges of the blade, the area of the blade adjacent to said edges being inwardly bent so as to cause the edges to incline inwardly or rearwardly towards the direction from which the strip is fed, said edges on the movable blade being constructed and arranged to travel in close shearing engagement with the stationary shear edge when the movable blade is advanced into contact therewith, the resilient material of the movable blade yielding to permit such action and serving to hold the movable edges at all times in contact with the fixed shear edge during the shearing operation.

14. In a strip-serving apparatus for a tacky strip, a guide and adhesion roller for engagement with the strip, said roller having a recess in its end with teeth on the inner wall of said recess, and ratchet means for engagement with said teeth comprising a spring coiled about the pivot of the roller having its outer end anchored to a relatively fixed support and having its inner end engaging with said teeth to form a pawl.

THEODORE H. KRUEGER.
EVERETT E. SHARPE.

REFERENCES CITED

The following references are of record in the file of this patent:

UNITED STATES PATENTS

| Number | Name | Date |
|---|---|---|
| Re. 22,732 | Krueger | Mar. 19, 1946 |
| 635,457 | Yandall | Oct. 24, 1899 |
| 1,293,959 | Smith | Feb. 11, 1919 |
| 1,890,131 | Schaub | Dec. 6, 1932 |
| 2,099,647 | Gautier | Nov. 16, 1937 |
| 2,311,363 | Bevier | Feb. 16, 1943 |
| 2,408,363 | Beckman | Oct. 1, 1946 |

FOREIGN PATENTS

| Number | Country | Date |
|---|---|---|
| 189,957 | Great Britain | Dec. 14, 1922 |